(12) United States Patent
Jain

(10) Patent No.: US 8,108,288 B2
(45) Date of Patent: Jan. 31, 2012

(54) DISTRIBUTED REVERSE AUCTION

(75) Inventor: Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 11/763,977

(22) Filed: Jun. 15, 2007

(65) Prior Publication Data

US 2008/0313069 A1    Dec. 18, 2008

(51) Int. Cl.
*G06Q 40/00*    (2006.01)
(52) U.S. Cl. .......................................... 705/37
(58) Field of Classification Search .................. 705/37
See application file for complete search history.

(56) References Cited

U.S. PATENT DOCUMENTS

| | | | | |
|---|---|---|---|---|
| 5,794,207 | A * | 8/1998 | Walker et al. | 705/1 |
| 7,346,520 | B2 * | 3/2008 | Etzioni et al. | 705/1 |
| 7,364,086 | B2 * | 4/2008 | Mesaros | 235/492 |
| 7,487,125 | B2 * | 2/2009 | Littlewood | 705/37 |
| 2005/0216364 | A1 * | 9/2005 | Jurisic et al. | 705/26 |
| 2008/0040232 | A1 * | 2/2008 | Perchthaler | 705/26 |
| 2008/0091479 | A1 * | 4/2008 | Mortimore | 705/5 |

* cited by examiner

*Primary Examiner* — Jessica Lemieux
(74) *Attorney, Agent, or Firm* — Lee & Hayes, PLLC

(57) ABSTRACT

A distributed reverse auction allows an auction to end when a dealer is first in time to accept a bid. A purchaser creates an account that relates to a specified purchase. The purchaser places bids at different dealers using the created account. The first dealer to accept the bid draws the agreed upon amount of money from the account. The other bids are cancelled and thus the dealer to act first in time engages in the sale.

16 Claims, 11 Drawing Sheets

DISTRIBUTED REVERSE AUCTION

TECHNICAL FIELD

The subject specification relates generally to auctions and in particular to distributed reverse auctions.

BACKGROUND

Purchasing though auctions is a popular form of transaction. In a conventional auction, an item is sold to a highest bidder. Two common forms of conventional auctions are an English auction and a silent auction. Under the English auction, a plurality of bidders place bids on an item in plain knowledge of one another, and the final bidder (e.g., the highest bidder) purchase the item for the agreed price. Under the silent auction, parties list a price on paper for an item during a specified amount of time. The highest bidder, and thus the final bidder, at the end of the specified time purchases the item for the listed price.

There is also an information form of auction known as bartering. During bartering, parties negotiate different prices for an item. Bartering can include a transaction of currency and/or a transaction of a good or service. Under this auction type, different purchasers received different prices based on the specific items they can offer as well as their ability to negotiate. Common bartering takes place between two parties: a buyer and a seller. However, some bartering takes place with multiple bidders for one seller. Both the English auction and the silent auction allow other bidders to know a bid price for an item.

Recent technological developments have popularized the use of auctions though the Internet. Conventional Internet auctions have sellers placing items on a web site over a set amount of time for potential purchasers to bid. Once a specified time has ended, the highest bidder receives the auctioned item. Since there is not physical presence of the auction, there is commonly an arrangement for transportation of the sold item. For example in addition to a bid price, there can be a shipping price associated with an item that is added automatically to the bid price.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The subject specification discloses an auction that ends when a seller is the first in time to accept a bid. This differs from an auction that ends when a bidder places a highest bid/places a bid last in time. A purchaser places at least two bids for two different, yet related items. The first bid in time to be accepted by a dealer is processed and a transaction takes place selling an item for a bid price. Commonly, acceptance of the first bid precludes execution of at least some subsequent bids.

The operation of this auction takes place through a specially designed account. A bidder sets up the account though a host and places parameters on the account (e.g., the amount of money that can be spent). The bidder then places bids on different goods and/or services. The bidder provides account information (e.g., an account number) to a seller for execution of a bid. If the seller desires to accept a bid, then she can attempt to complete the transaction with the bid price. The transaction completes if the seller is first in time to accept the bid compared to other bids or other specified criteria is met. The account contains logic that allows for distinguishing between a first in time accepter and a subsequent accepter.

The account can configure to allow a dealer to know what other bids the bidder has made. This can provide valuable information in evaluating a bid as well as information for negotiation with a bidder. Furthermore, the account can configure to automatically accept or deny counter-bids that take place from a dealer.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
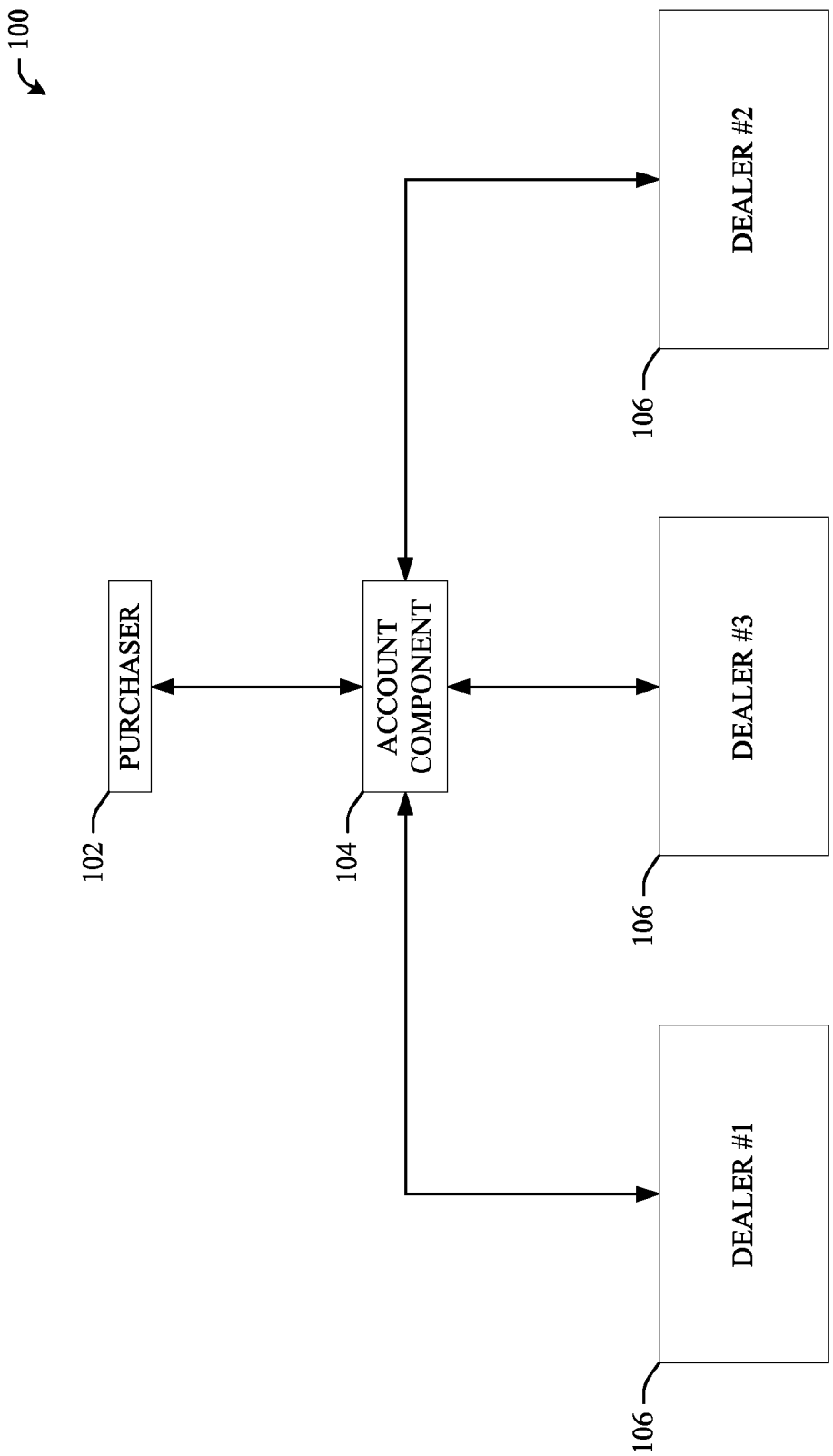
FIG. 1 illustrates a representative distributed reverse auction system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components. As used in this application, the terms "purchaser", "bidder", and the like are to be used interchangeably for a party on a buying side of a transaction and/or tentative transaction.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for operation of a distributed reverse auction. A purchaser 102 creates an account component 104 to be used for a purchase. The purchaser functions as a bidder prior to the execution of a purchase. The account component 104 can be structured in a manner to allow a user to have freedom when making a purchase. The purchaser 102 places bids on related items from different dealers 106. In placing the bid, the purchaser 102 can give information concerning the account component 104 (e.g., the account number.)

The first dealer 106 to accept the bid can sell the item to the purchaser 102. When the first bid is accepted, other dealers 106 are stopped from completing their transaction. The stop commonly takes place through the account component 104 where the account component 104 contains a mechanism to regulate between a first acting dealer 106 and a subsequent acting dealer 106. According to this model, the first in time to accept completes a transaction. The system 100 can configure to allow a purchaser 102 to cancel a bid prior to acceptance by a dealer 106.

A purchaser 102 can create an account component 104 though a number of different manners. A purchaser 102 can set up an account through an Internet web site. The purchaser 102 can make specific limitations on the account component 104; for example, the amount of money that can be expended through the account component 104 or the purchase type in which the account component 104 can draw (e.g., a purchase for a home stereo system).

According to another embodiment, the purchaser 102 can set up an account through a bank. The purchaser 102 can create an account component 104 that is linked with a checking account. When a bid is accepted from a dealer 106, the account component 104 draws money from the checking account. It is possible for the account component 104 to be utilized through use of a one-time credit card.

The system differs from a number of conventional systems. Under many conventional systems, the bidder with a specific price characteristic wins. For example, at a conventional charity auction, the party that bids the highest amount of money received an item. In another example, in at an Internet store, a seller who offers the lowest price commonly sells the item. None of these models allows an auction to end when a party acts first in time.

In an example, implementing the system described in FIG. 1, a purchaser desires to obtain a 50-inch plasma television (TV). However, a common purchaser is not always looking for the best price; the purchaser can also be looking for the best value. For instance, a purchaser can believe that items made in the United States have a specified level of quality and have a desired impact upon the United States economy. For this example, a purchaser travels to three different stores on a Saturday.

A purchaser can go to a discount dealer and see a 42-inch off-brand plasma TV made in Quebec City, Quebec, Canada for $1800. The discount dealer has a reputation of having the cheapest prices, however, the merchandise is commonly thought of as having lesser quality and there is a social stigma of people who purchase from the discount dealer. Due to numerous imperfections in the purchase (e.g., the social stigma, the discount dealer plasma TV is made outside of the United States, etc.), the purchaser would not likely want to pay $1800 for the discount dealer plasma TV. However, to find a bargain, the purchaser could place a bid on the discount dealer plasma TV for $1400. The purchaser would give a number associated with the account component and if the discount dealer wants to accept the bid, the dealer can charge $1400 to the account.

The purchaser can go to a wholesaler who is selling a 50-inch name brand plasma TV made in Jackson, Miss. for $3200. Purchasing from the wholesaler can have no negative social stigma. While the plasma TV offered by the wholesaler meets the criteria established by the purchaser, he can feel that the price offered for the wholesaler plasma TV is too high. Therefore, the purchaser can offer a price of $3000 for the wholesaler plasma TV. Again, the purchaser would give a number associated with the account component and if the discount dealer wants to accept the bid, the dealer can charge $3000 to the account.

The purchaser then travels to an electronics store who sells a 60-inch name brand plasma TV made in Indianapolis, Ind. for $3500. Purchasing from the electronics store can carry a positive level of social stigma, where purchasers from that store have a certain level of sophistication. While the purchaser would receive a larger plasma TV then expected for what can be seen as a reasonable price, the purchaser can still think he can lower the price. The purchaser can place a bid down of $3000 for the electronics store plasma TV. The purchaser would give a number associated with the account component and if the discount dealer wants to accept the bid, the dealer can charge $3000 to the account.

On Sunday, a day after the purchaser visited the wholesaler, the wholesaler can accept the offer. The purchaser can be notified that the sale took place and an arrangement should be made on how to obtain the wholesaler plasma TV. According to one embodiment, a notice can be sent to the discount dealer and the electronics store that a transaction has taken place and they can no longer exercise their bid. Therefore, even if the electronics store exercises the bid on Monday, they would be unable to since the wholesaler accepted the bid on Sunday.

The system disclosed can be also be implemented upon an online model. For example, the three dealers can be different web sites on the Internet or the three dealers can be three different accounts on one web site. Computer code can operate the account component and communication can take place through digital medium.

The disclosed system 100 allows for benefits for both a purchaser 102 and a dealer 106. A purchaser 102 who looks for bargains and is a shrewd negotiator can find a better value on a purchase. Furthermore, there are situations where the cheapest dealer is not providing the best value.

From a dealer 106 standpoint, a product is placed on the market and the seller finds the purchaser 102 and thus the demand. For example, a dealer 106 advertises to attract a purchaser 102 to a store. Implementation of the system 100 allows a dealer 106 to judge an exact demand for the product and determine what a common purchaser 102 can be willing to pay for the product (e.g., price differentiation.)

For example, a product can be placed on the market by the dealer 106 and the dealer 106 can list is at $1000. However, the dealer 106 can find that a number of purchasers 106 are employing a distributed reverse auction to buy their product. Since there are a relatively large number of purchasers 106 who can be classified as bargain-hunters because they employ a distributed reverse auction, a dealer can price their product accordingly.

While the subject specification discusses cash for product transactions, it is to be appreciated that other transactions can take place in accordance with the subject specification. Transactions can include currency, products, and/or services. For example, a bid can be made for the service of auto repair while the purchaser is offering a specified amount of time of financial consultation.

Figure 2:
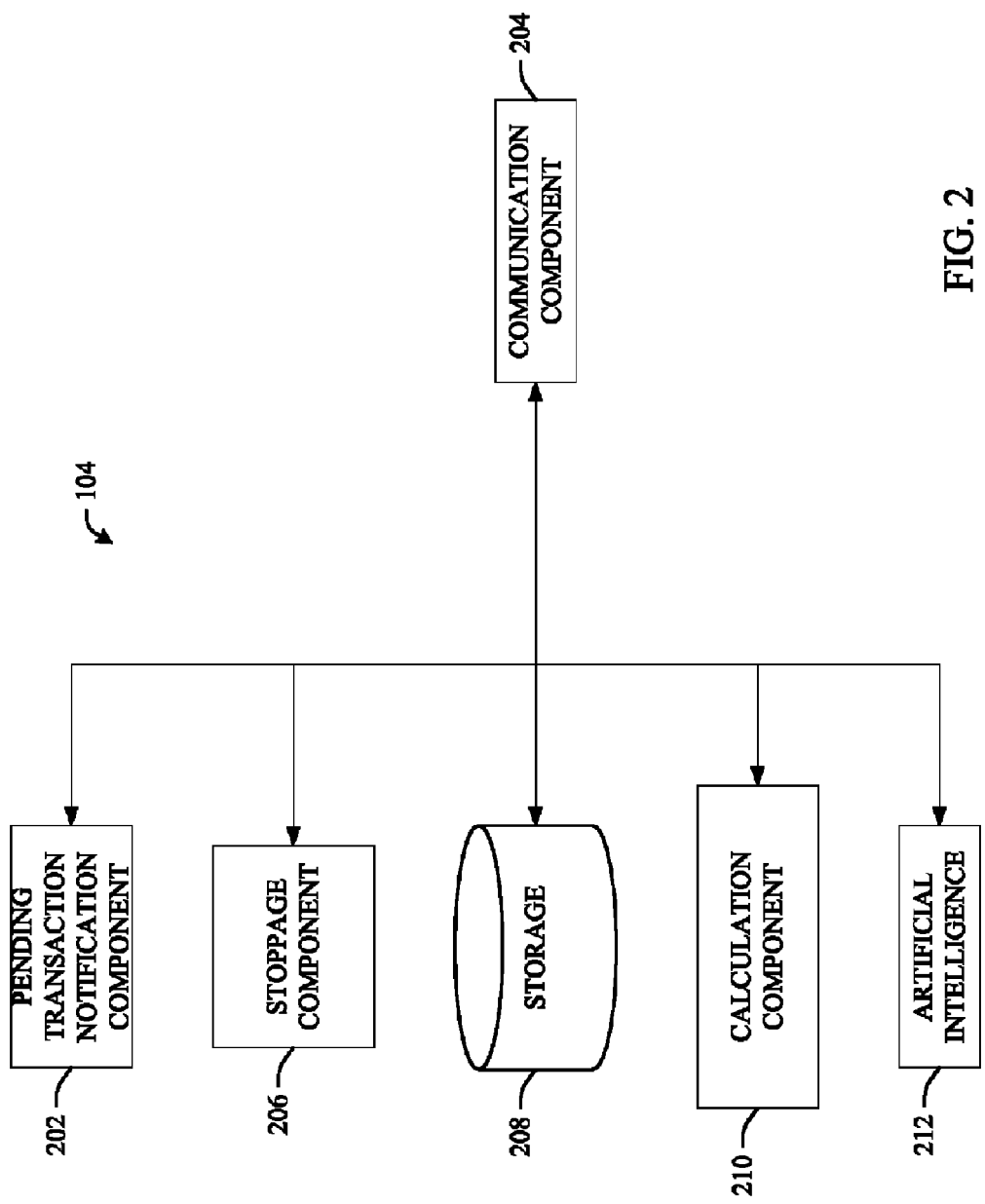
FIG. 2 illustrates a representative account component in accordance with an aspect of the subject specification.

FIG. 2 discloses an example account component 104 of FIG. 1. An account component can have a pending transaction notification component 202 that allows other dealers to know the transaction status concerning the account component 104. Information concerning other related transactions allows a dealer to make a more educated decision concerning sale of a product.

For example, a purchaser 102 of FIG. 1 can be in the market to purchase an automobile. According to a first example, the purchaser can go to four different dealers that sell the same types of automobiles. In the first example, the purchaser goes to four different Ford automobile dealers and at the dealers, the purchaser places a bid on a Ford Mustang. The bids can be identical, and the purchaser can hope that one of the four dealers will accept the bid. However, the bids can also be different based on specific features of a single Ford Mustang (e.g., convertible, automatic transmission, color, etc.)

According to a second example, the purchaser places bids at four different automobile dealers. In the second example, a purchaser can place bids on different automobiles and this information can be transferred to other dealers. Information concerning other bids can transfer to another dealer that has an outstanding bid and information about other bids can transfer to a dealer in which the purchaser is currently negotiating. The transfer of information can take place through utilization of a communication component 204. While the communication component 204 is disclosed as integrated with the account component 104, it is to be appreciated that the communication component 204 can function as an independent unit.

The pending transaction notification component 202 can operate according to a number of different embodiments. According to one embodiment, the purchaser pays a fee in order to have a pending transaction. Without payment of a fee, a purchaser can simply make a plurality of bids without necessarily having a serious intention of placing the bid (e.g., a bid on a Ford Mustang for $1000.) Therefore, placement of the fee allows a dealer to ascertain accurately the motivation of the purchaser.

According to another embodiment, a limited amount of information is provided to the dealer. For example, the fact that a purchaser has made bids can be disclosed, but specific products and costs can be kept hidden. Furthermore, the relevance of bids made can also be disclosed to the dealer. For example, an automobile dealer can be told what bids are relevant (e.g., bids on other automobiles) and what bids are irrelevant (e.g., a bid for a plasma TV).

This information can allow a dealer to understand better the purchaser. With this information, the dealer can employ more appropriate negotiation tactics and present a value to the purchaser that is of benefit to the dealer. Furthermore, a knowledgeable purchaser can use multiple bids to create a better value then the purchaser would have received without using multiple bids. In another embodiment, the dealer can use the pending transaction notification component to obtain personal information of the purchaser and/or to negotiate a price with the purchaser.

Once a dealer accepts a bid, other dealers are commonly stopped from engaging in other bids. The capability to stop other bids is located in a stoppage component 206. The stoppage component 206 can operate outside of financial capability. For example, a purchaser can configure an account component 104 to not allow a transaction over $4000. The purchaser can then make two bids, a first bid from a first dealer for $1500 and a second bid from a second dealer for $1800. If the first bid is accepted, the second dealer cannot exercise the second bid; this takes place even though the account component 104 is configured to allow for enough money for both bids.

The stoppage component 206 can configure to prevent the execution of related bids to an accepted bid. An account component 104 can be an account held by a web site with a specific service (e.g., an electronics store web site for purchasing electronics.) A purchaser can make bids on three different plasma TVs during a four-day span. Once one bid is accepted, the stoppage component 206 prevents the execution of the other two bids.

However, if after the acceptance of one bid and notification to a purchaser of the execution of the bid the purchaser places a new bid on another plasma TV, the new bid can be classified as unrelated. This allows for multiple uses of the account component 104. This allows for the account component 104 to be used multiple times without needing to create a new account.

According to one embodiment, information concerning other transactions is saved in storage 208. While the storage 208 is disclosed as part of the account component 104, it is to be appreciated that it can be located in another component or as a stand-alone component. In a further embodiment, communication with other bids takes place with a central database thought the communication component 204. The communication component 204 can operate in a number of different manners; this includes wireless communication and transmission thought physical wires.

The account component 104 can configure with a calculation component 210. The calculation component 210 can make determinations based on interaction of bids from a dealer. For example, a purchaser can place a bid on an $1800 plasma TV for $1500. A dealer can make a counter-bid of $1600 and the dealer will add a Digital Video Disc (DVD) player valued at $150. According to one embodiment, the calculation component 210 performs computations if the counter-bid should be accepted. In making the computations, the calculation component 210 can employ artificial intelligence 212.

The artificial intelligence 212 can employ a probabilistic-based or statistical-based approach, for example, in connection with making determinations or inferences. The inferences can be based in part upon explicit training of classifier(s) (not shown) before employing the account component 104, or implicit training based at least upon a purchaser's previous actions, commands, instructions, and the like during use of the account component 104.

The artificial intelligence 212 can employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Artificial intelligence 212 can operate to allow automation of functions concerning the account component 104. For example, artificial intelligence 212 can accept a response from a bid first in time from a plurality of bids.

According to one embodiment, a dealer sends a counter-bid to the account component 104. The artificial intelligence 212 determines if the counter-bid should be accepted. This can take place through utilization of the calculation component 210. For example, the account component 104 can configure with specific tolerances (e.g., if a counter-bid is made within 5% of the original bid, then the counter-bid should be accepted.) The artificial intelligence 212 can also base this on previous engagements of the account component 104. The calculation component can make computations relating to the account component (e.g., computing the percentage difference between an original bid and a counter-bid).

According to another embodiment, when a counter-bid is made, the communication component 204 contacts the purchaser. The purchaser can modify the bid or go into further negotiation with a dealer. According to a further embodiment, a purchaser can configure the account component 104 to reject counter-bids automatically without regard to the substance of the counter-bid.

Figure 3:
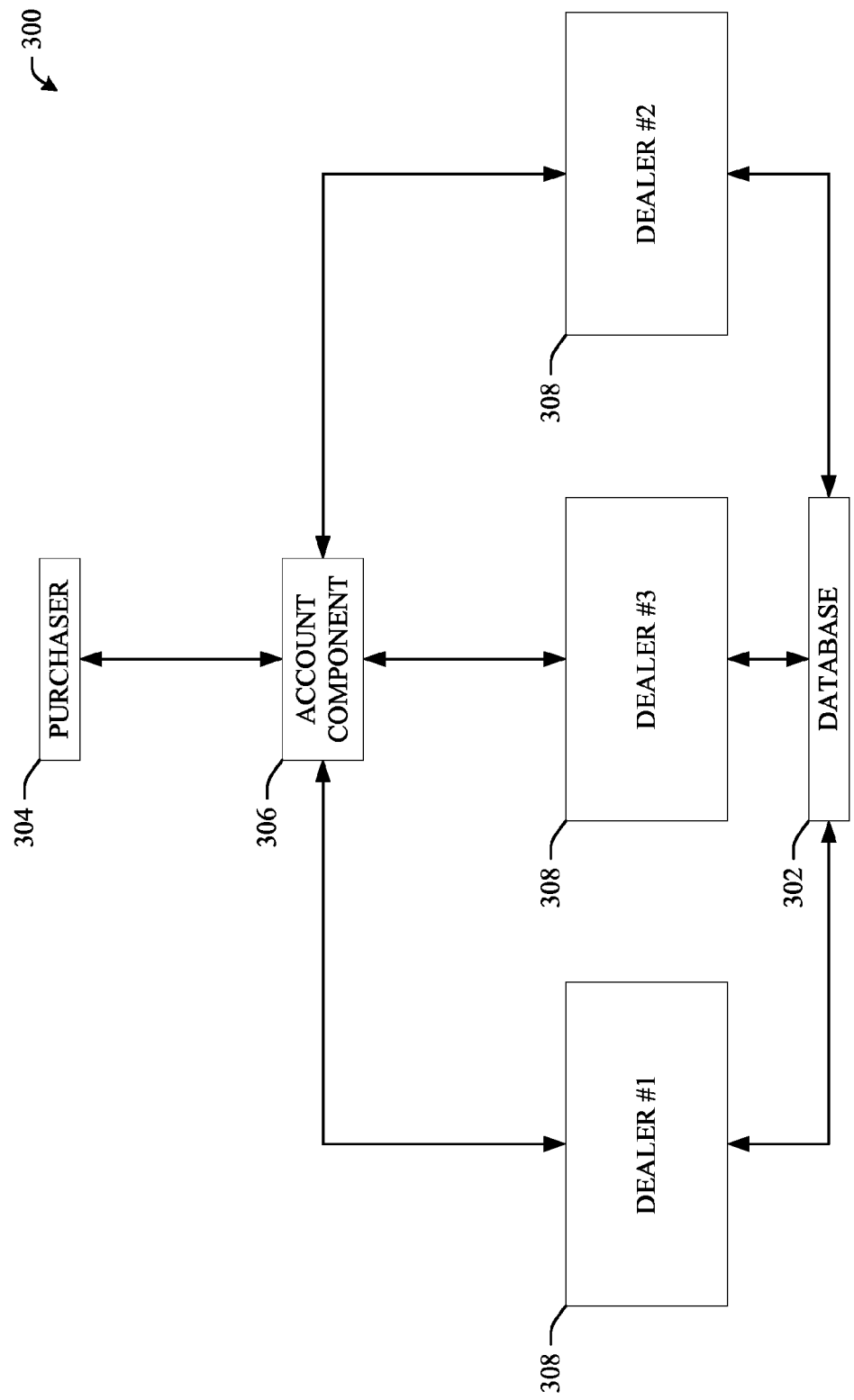
FIG. 3 illustrates a representative distributed reverse auction system with a database in accordance with an aspect of the subject specification.

FIG. 3 discloses an example distributed reverse auction system 300 with implementation of a database 302. Similar to the configuration of FIG. 1, a purchaser 304 creates an account component 306 to allow for multiple bids for a select item. The purchaser makes different bids on items to different dealers 308. The dealer 308 first in time to accept the bid completes a transaction in conjunction with the bid and other dealers commonly are stopped from completing other transactions.

In making a determination to accept a bid, dealers 308 can rely on a database 302. Furthermore, the database 302 can be used during negotiation. The database 302 contains various types on information relating to the purchaser and the tentative transaction. Dealers can evaluate information to determine how to approach a bid or evaluate a bid.

For example, the database 302 can include information as to other bids the purchaser 304 has made in other transactions. If a purchaser has a history of providing extremely low bids, then dealers can negotiate knowing that a purchaser does not historically accept under-valued bids.

The database 302 can also contain information relating to other dealers involved in the transaction (e.g., other dealers that have outstanding bids). In evaluation of a bid, it can be beneficial to know the history of other dealers 308 that relate to the bid. For example, if a dealer 308 with a related bid has a history of not accepting bids lower then a presented value, then another dealer 308 can use that information to determine the likelihood that the other bid will be accepted.

According to one embodiment, the database 302 contains information relating to the bids, similar to information included within the account component 104 of FIG. 2. For example, the database 302 contains information relating to other bids that have taken place concerning the transaction. A neutral party to ensure that information concerning other transactions is accurate can operate the database 302.

Figure 4:
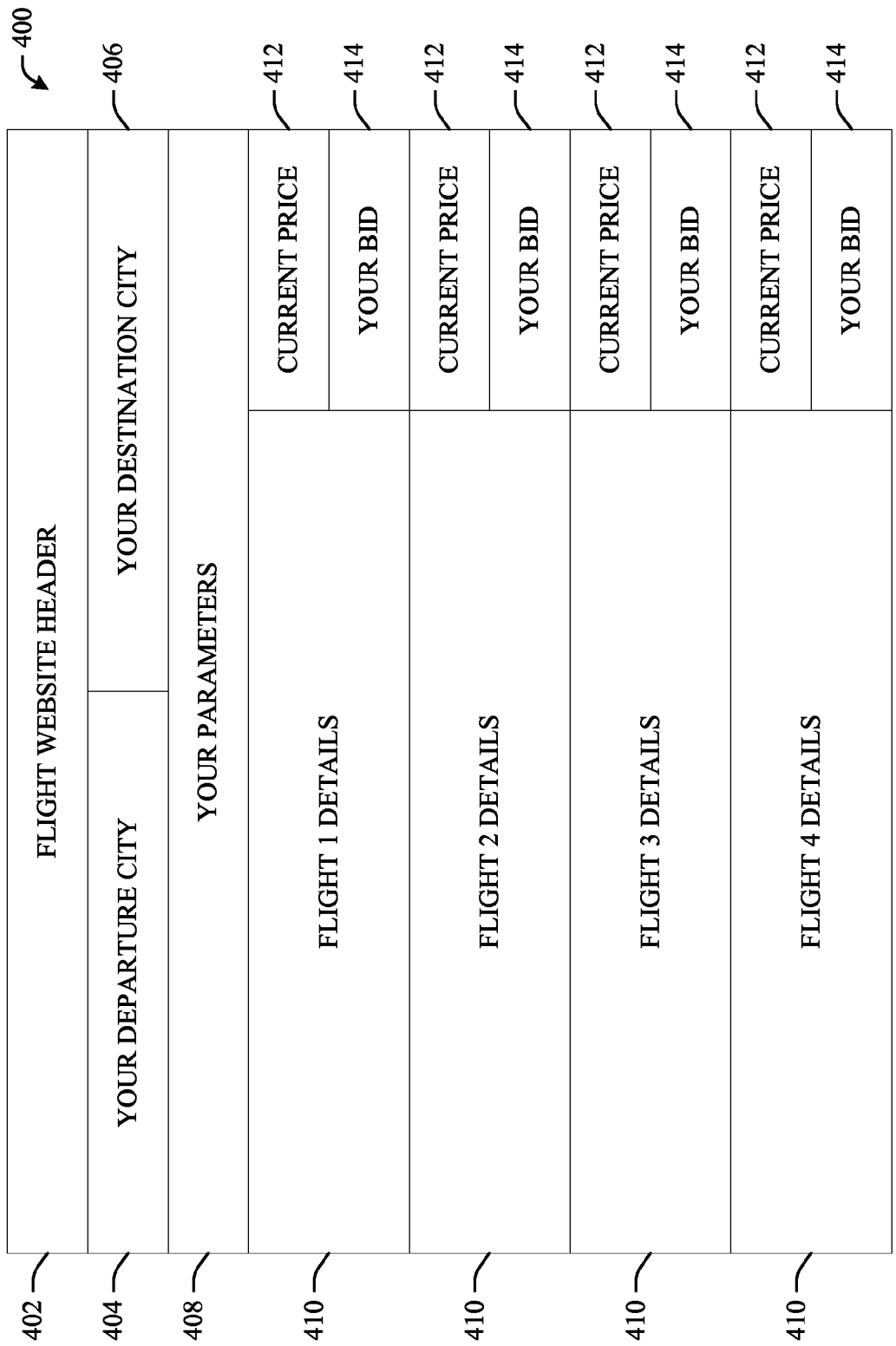
FIG. 4 illustrates a representative user interface in accordance with an aspect of the subject specification.

FIG. 4 discloses an example web site interface 400 using aspects disclosed in the subject specification. As opposed to multiple dealers, a purchaser can make several bids on several different items to one dealer. The specific example demonstrated is a purchaser who wants to book a flight; however, other interfaces and scenarios are possible. A web site header 402 presents promotional and identification information about the web site. The web site header 402 can also assist a user who is not familiar with the interface or contain profile information of a frequent user.

Commonly a departure city 404, destination city 406, and parameters 408 are presented to a user. This assists in preventing a mistaken transaction from taking place since a purchaser can see flight details before bidding on a flight. Commonly a purchaser will select the flight cities 404 and 406; however, the details can be selected by the system implementing the interface. For example, through a promotional offer, specific cities and parameters can be available.

In the disclosed example, a purchaser is presented with four flights 410 where the flights 410 are presented in accordance with specific flight details (e.g., time, connection number, connection cities, etc.) The flights are associated with two options: an option to purchase a flight for a known price 412 or an option to bid on a flight 414. Bidding on a flight can render a flight cheaper.

According to one embodiment, the user can be required to bid on a minimum of two flights 410. The company that operates the web site selects which of the flights 410 to accept or not to accept a flight 410. This allows a purchaser to obtain a flight 410 at a value while knowing specific information about the flight 410.

In a conventional reverse auction, a purchaser selects the price that they want to pay for an item or service. However, the purchaser does not always receive what they wanted. For example, a purchaser can place a bid on a flight web site for a one-connection maximum flight from Seattle, Wash. to San Jose, Calif. for $200. If accepted, the purchaser can receive a flight that connects through Chicago, Ill. (e.g., a flight from Seattle to Chicago and a second flight from Chicago to San Jose.) It is doubtful that this is the fight that someone wanted; thus, a purchaser is receiving something that he did not want.

Figure 5:
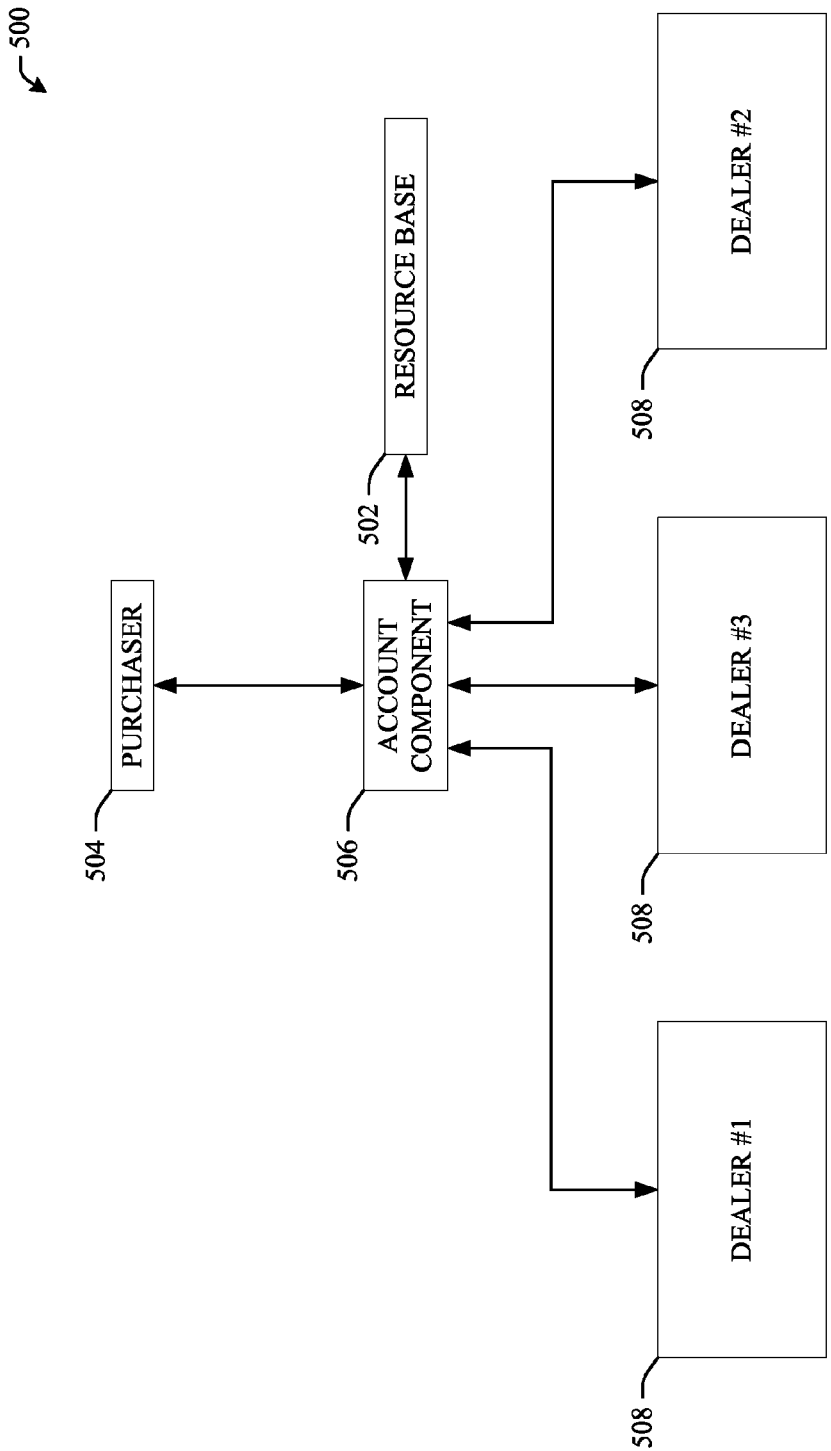
FIG. 5 illustrates a representative distributed reverse auction system with a resource base in accordance with an aspect of the subject specification.

FIG. 5 discloses an example distributed reverse auction system 500 with implementation of a resource base 502. Similar to the configuration of FIG. 1, a purchaser 504 configures an account component 506 to enable the presentment of multiple bids to different dealers for different items. The purchaser makes different bids on items to different dealers 508. The dealer 508 first in time to accept the bid completes a transaction in conjunction with the bid and other dealers commonly are stopped from completing other transactions. The resource base 502 governs engagement of a transaction concerning an acceptance of a bid subsequent to the bid that was accepted first in time.

In the disclosed drawing, a resource base 502 contains a specific amount of a resource. For example, the resource base 502 can be an amount of money or have a designated amount of time (e.g., for a good, the purchaser will provide a number of hours performing a service where the resource base is an eight-hour work day). The account component 506 can configure to accept the first accepted bid in time as well as subsequent bids that do not completely drain the resource base 502.

For example, a purchaser 504 of a baseball team can desire to buy baseballs and according to a budget, the purchaser 504 can spend $500, which is the amount placed in the resource base 502. The purchaser 504 can make a bid to a first dealer 508 for $200 for 100 baseballs. The purchaser 504 can make a bid to a second dealer 508 for $400 for 120 baseballs. The purchaser 504 can make a bid to a third dealer 508 for $300 for 150 baseballs.

The first dealer 508 can accept the bid, and since the bid is first in time, the transaction is completed by the account component 506. This leaves $300 in the resource base 502. After the first dealer 508 accepts the related bid, the second dealer 508 can accept the related bid. However, since there are not enough resources in the resource base 502, the bid can be denied. According to one embodiment, once a bid is denied, subsequent bids are also denied.

According to another embodiment, bids function independent of one another. In the disclosed baseball example, after actions of the first and second dealers 508, the third dealer can accept the related bid. Since there are enough resources in the resource pool to cover the third dealer bid, the third dealer bid can be processed and the transaction can complete.

It is to be appreciated that the resource base 502 can incorporate into the account component 506. Furthermore, the account component 506 can have a limited amount of funds without implementation of a resource base 502. For example, the account component can be structure to accept a bid of no larger then $5000. If a first bid is accepted of $1500, then a second bid can be rejected even if the bid is at or below $3500.

Figure 6:
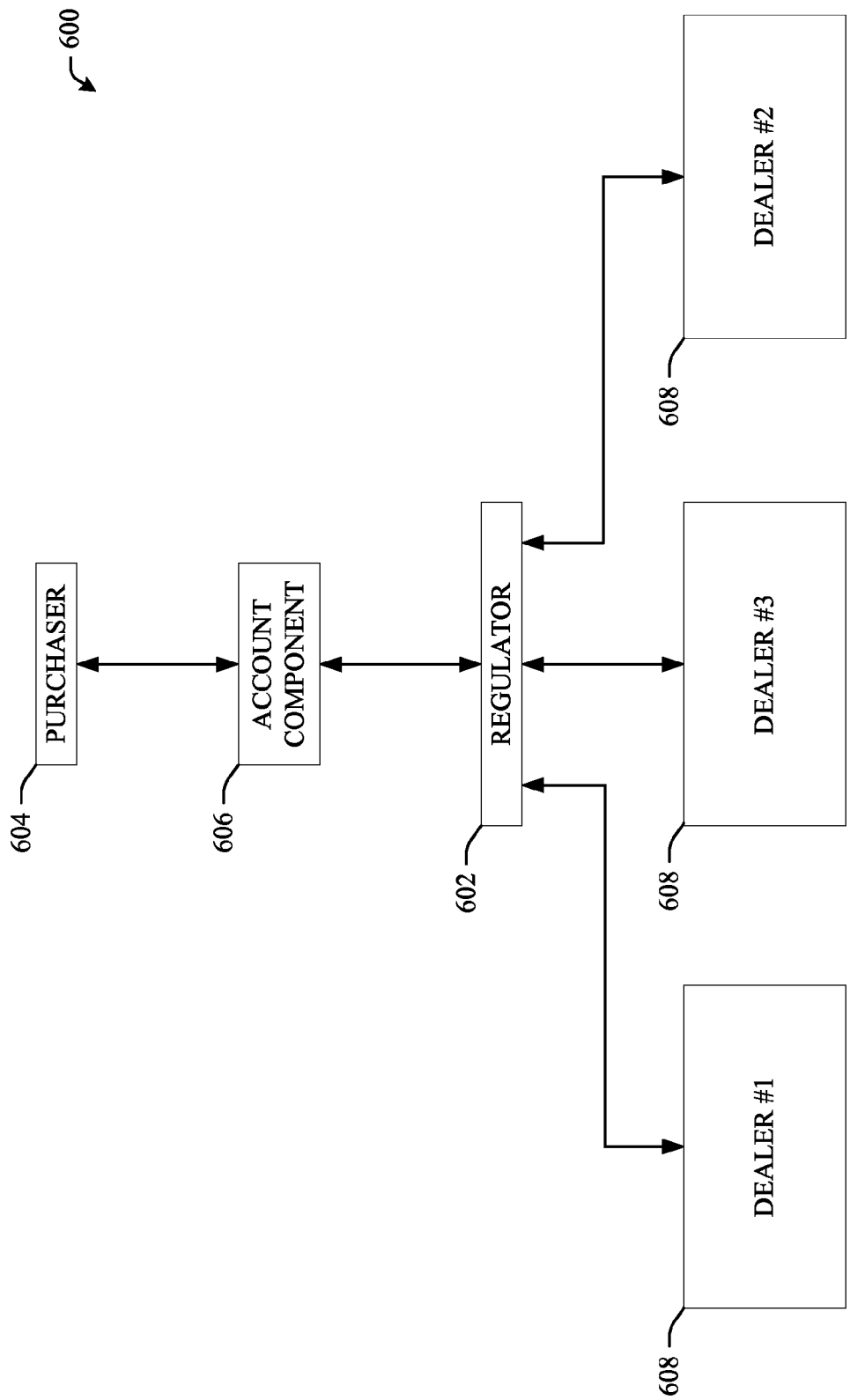
FIG. 6 illustrates a representative distributed reverse auction system with a regulator in accordance with an aspect of the subject specification.

FIG. 6 discloses an example distributed reverse auction system 600 with a regulator 602. A purchaser 604 configures an account component 606 for user during a distributed reverse auction. For example, the account component 606 can connect with a checking account. An amount of $3000 can be spent on a transaction through the distributed reverse auction system 600. In this operation, the account component 606 draws money from the checking account and transfers the funds to a first in time dealer 608 to accept a bid.

The regulator 602 can function to prevent mistakes and incorrect bids thought the account component 606. The regulator 602 checks if a bid from a bidding entity is within constraints of the account component 606. For example, the account component 606 can configure to allow a bid of up to $3000. A purchaser 604 can attempt to limit his purchase for budget-saving purposes.

However, the purchaser 604 can desire an item from a dealer 608 that is virtually impossible to purchase with a $3000 bid. Therefore, the purchaser 604 places a bid on an item of $4000. However, this is beyond the constraints of the account component 606. The regulator 602 performs a check on the amount and determines the bid amount is beyond the $3000 constraint.

Once the regulator 602 completes the check, the regulator 602 can operate in different manners. In one manner the regulator 602, can automatically reject the bid and send notification to the purchaser 604 that the bid is outside of the constraints. In another manner, the regulator 602 notifies the purchaser 604 that the bid is outside of the constraints of the account component 606 and asks the purchaser 604 how he would like to proceed. In yet another manner, the regulator 602 performs the check, but takes no further action.

According to another embodiment, the regulator has communication with a credit company. For example, the account component 606 does not have a fund limit available, but the account component 606 is linked with a credit card company. When a purchaser 604 places a bid, the regulator 602 performs a check if the purchaser 604 has adequate credit for the bid. Based on the result of the check, the bid can be approved or denied. Furthermore, notification can be sent to the purchaser 604 concerning the check.

The regulator can function in other manners to assist in the operation of the distributed reverse auction system 600. According to one embodiment, the regulator 602 can configure to prevent tampering from dealers 608. In another embodiment, the account component 606 provides information of other pending bids to dealers 608 who pay a service fee. The regulator 602 functions to allow dealers 608 to access the information if the service fee has been paid and reject dealers 608 who have not paid the service fee.

Figure 7:
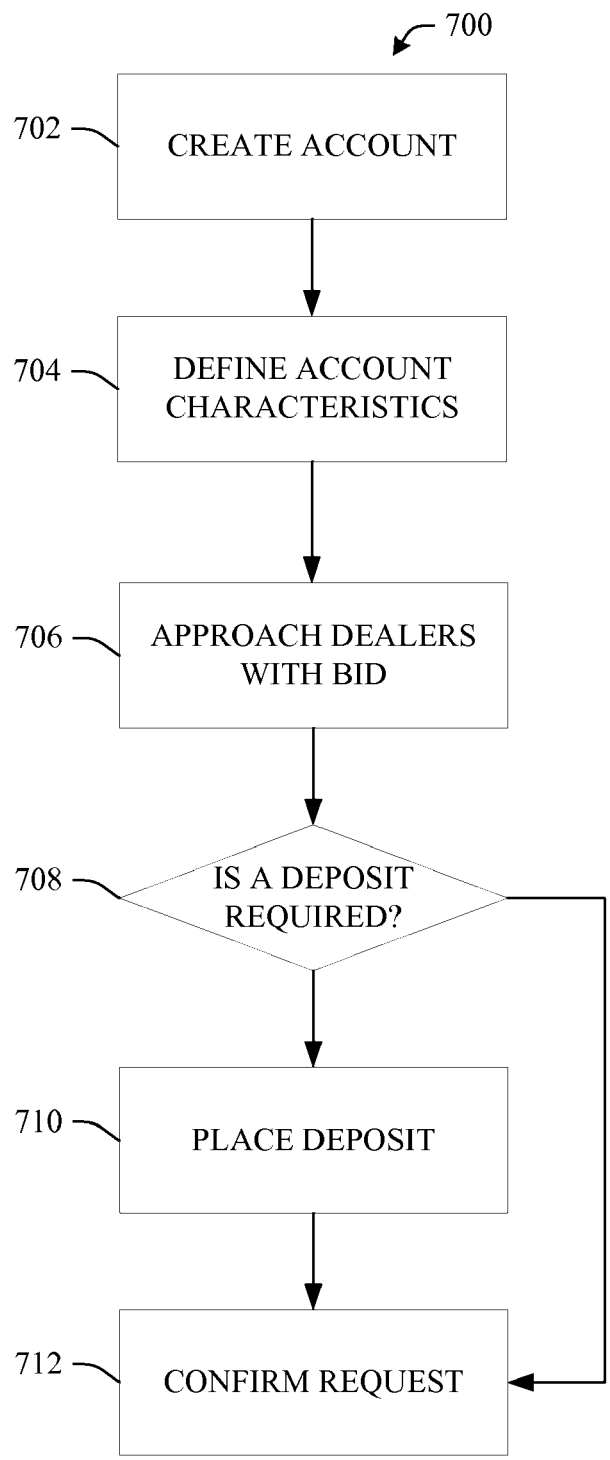
FIG. 7 illustrates a representative purchaser action methodology in accordance with an aspect of the subject specification.

FIG. 7 discloses an example methodology 700 of actions taken by a purchaser to initiate a bid. Initially, a purchaser creates an account 702 that is utilized during placement of a bid. The account is commonly held by a host; for example, the account is held by a web site or bank. The created account can be for a one-time use or can be an account that can be used multiple times. While there is reference to a purchaser, the purchaser is a bidder prior to the transaction.

During account creation 702, the purchaser defines characteristics relating to the account 704. Characteristics provide parameters that are followed during utilization of the account. For example, the characteristics can limit the amount of money that can be spent through the account and/or other parties that can use the account. Furthermore, the action 704 can include agreeing to specific contractual parameters concerning the account (e.g., limiting liability of the host).

The purchaser approaches a dealer with a bid 706. This can take place through a plurality of manners. According to one embodiment, the purchaser physically travels to different stores and places bids on different items. In another embodiment, the purchaser places bids on a single host web site that searches for items of interest to the purchaser (e.g., flights). In a further embodiment, the purchaser places bids on different items on different web sites. In yet another embodiment, the purchaser performs a combination of previously discussed embodiments; for example, the purchaser places a bid at a physical location, a host web site, and/or a non-host web site.

A check is performed to determine if a deposit should be placed in making a bid 708. It can be beneficial to require a deposit when a purchaser places a bid. For example, a purchaser can use false bids to her advantage that would deceive a dealer. Therefore, requiring a deposit on a bid can assist in assuring a dealer that another outstanding bid could be exercised.

If a deposit is required, there is an action for placement of the deposit 710. Placement of the deposit can configure to be a revenue stream for the host of the account. For example, the place a bid, the purchaser places 2% of a bid down as a deposit. If a dealer accepts the bid first in time, then the deposit toward that bid is placed against the purchase price. Bids that were not accepted first in time have the deposits transferred to the host. There can be other configurations of deposit placement, such as the deposit amount is credited to specified dealers.

Regardless if a deposit is placed, a confirmation 712 can be sent that a valid bid has been made. The confirmation 712 can be provided to a number of different parties. Information can travel to the purchaser, the dealer, the host, a third-party to the tentative transaction.

Figure 8:
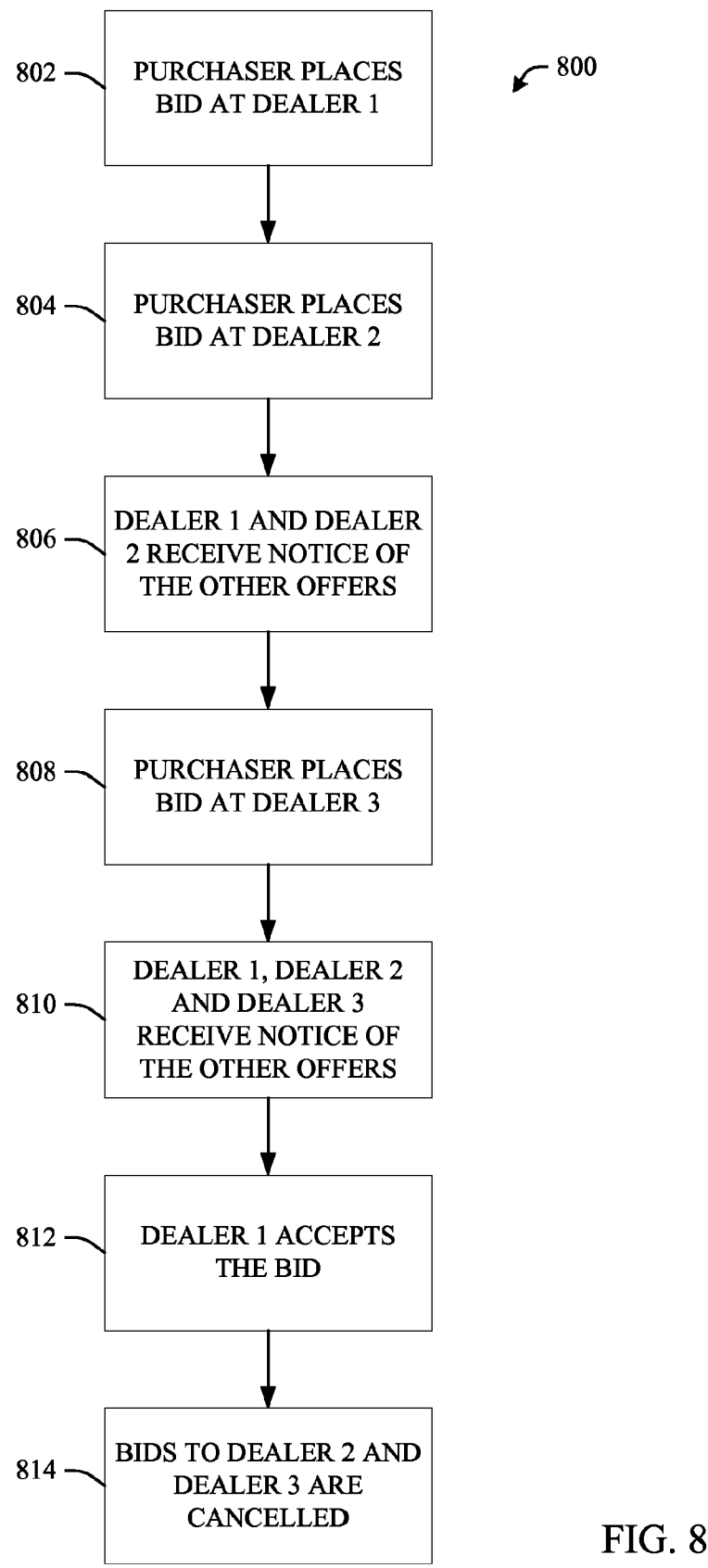
FIG. 8 illustrates a representative negotiation methodology in accordance with an aspect of the subject specification.

FIG. 8 discloses an example negotiation methodology 800. A purchaser places a bid at a first dealer 802. This can take place through a number of different embodiments. According to one embodiment, a purchaser can submit a bid through an Internet web site. According to another embodiment, the purchaser sends a message to an account component concerning specific details relating to the bid. For example, a bidder can send a message to an account component that a specific store has a specific bid. This can also be automated through interaction with the Internet web site.

The purchaser places a bid at another dealer 804. This can be a different type of bid then the bid placed in event 802. Furthermore, the bid can be on an item that is merely related to the bid placed in action 802. The relationship can be a loose relationship so long as there is a relationship.

For example, a bidder can have a breakdown of her current automobile. The bidder can take the automobile to a repair company and request a quote for the amount of money it will cost to repair the automobile. Based off the quote, the bidder can place a bid on how much she would be willing to pay for a repair. The bidder travels to a used automotive dealer and looks at a used automobile. The bidder places a bid on the used automobile. Both of the bids relate to automotive transactions, while one is a repair and another is a sale. It would be detrimental for both bids to execute since it is unlikely the bidder needs two working automobiles.

There can be notice between dealers that there are other outstanding bids 806. This can allow a dealer to have better knowledge of a bid and how to act upon the bid. For example, if the repair company knows the bidder is bidding on a different car, then the bidder is not in a difficult situation since there is another option. Therefore, this could change how they counter-bid or if they accept the bid.

Actions 804 and 806 can be applied to a third dealer. Commonly, this includes placement of a bid to a third dealer 808 and dissemination of information about the bid to other dealer 810. Transfer of information to other dealers does not have to be automatic. For example, there can be a requirement that a bidder authorize the dissemination of other bids. There can be situations where to knowledge of other bids to a dealer can be detrimental to a user. In another example, dealers pay a fee to learn about other bids.

One of the dealers accepts a bid 812, which is a dealer to act first in time. This can be through a number of different embodiments. For example, a dealer can enter account information into an electronic device to accept a bid. Acceptance of one bid can initiate an elimination of bids to other dealers 814. Cancellation of a bids to other dealers can apply in different manners, such as to non-first in time dealers or to a dealer that is last to accept a bid.

Figure 9:
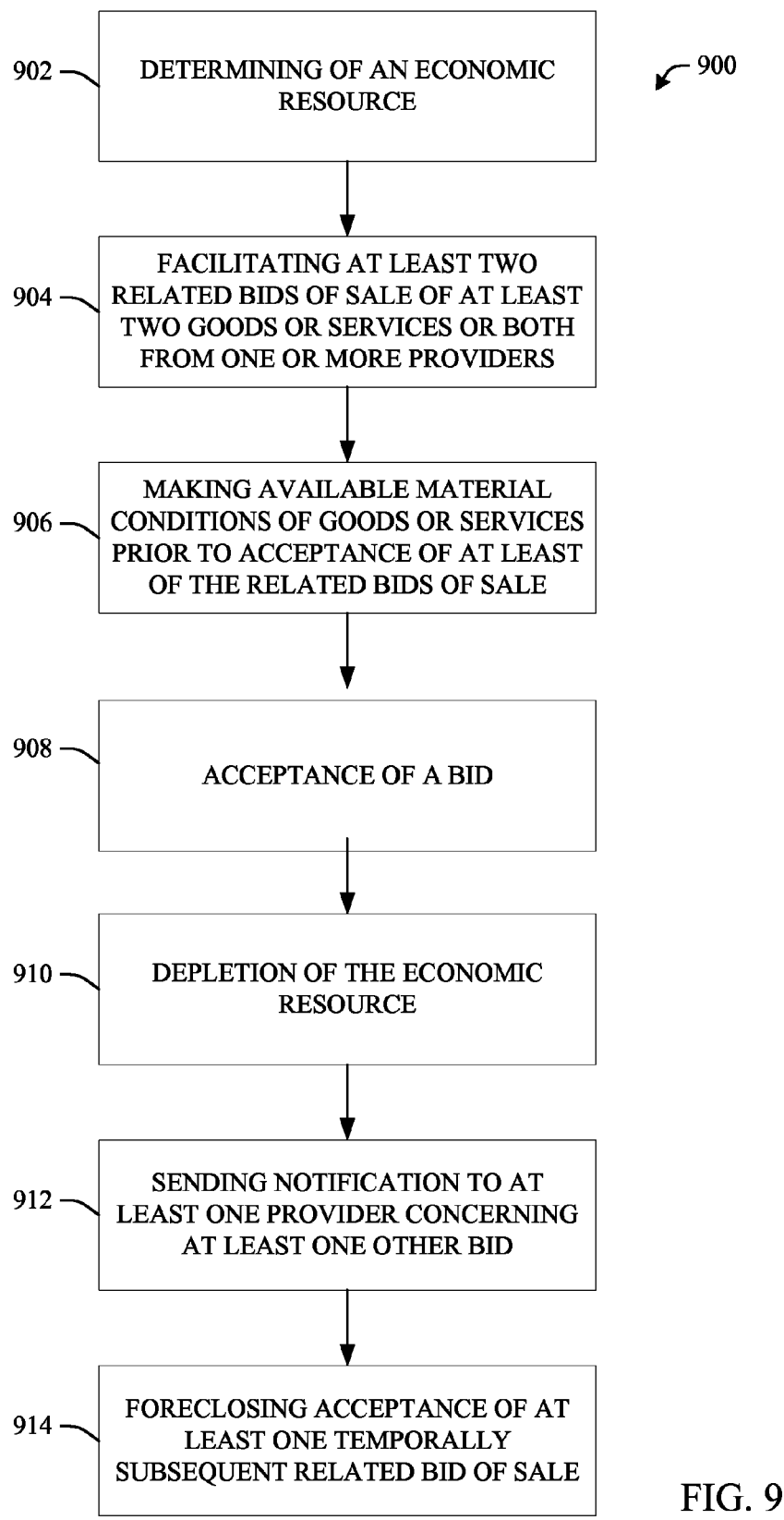
FIG. 9 illustrates a representative host methodology in accordance with an aspect of the subject specification.

FIG. 9 discloses an example methodology carried out by a host of an account 900. The host determines an amount of an economic resource 902. The economic resource can be the amount of money a bidder can spend on an item. The determination can take place through a number of different embodiments. For example, the determination can be made through reception of information from a potential bidder (e.g., potential bidder sends information that a bid can be a maximum of $3000.) In another example, a potential bidder relates to a credit limit and the host determines the amount of money a bidder can spend.

The host facilitates at least two related bids of sale of at least two goods or services or both from one or more providers 904. This can take place through a plurality of different embodiments. For example, the host can be a web site that holds an account that allows bids to be made by a purchaser. The account allows a purchaser to place bids on at least two different goods or services. For example, the purchaser can place a bid on at least two different flights. These flights can be from the same airline; however, the flights contain different characteristics. Action 904 can take place independent of operation of an economic resource (e.g., the action can function with no economic resource constraint.)

According to another embodiment, the host is a credit card company. The credit card company issues a one-time use card to a purchaser. The purchaser provides the card to a dealer and the dealer can execute the bid through the card. The card can tie directly to an account associated with a purchaser. Facilitation can take place when at least two distributors provide the goods or services. Distributors can be the same as providers; however, there can be differences between the two. For example, one airline (e.g., provider) can supply flights, but two travel agencies (e.g., distributors) bring the flights to the open market.

Action 906 is making available material conditions of goods or services prior to acceptance of at least one of the related bids of sale. Knowledge of material condition of the good or service can be of benefit to a bidder. For example, if a purchaser wants to order an airplane flight, then it can be important know that there is a connection as well as where the connection takes place. Providing material conditions allows a purchaser to make an informed decision.

According to one embodiment, material information is provided to a purchaser prior to placing a bid. This allows a purchaser to make an informed decision when placing a bid. According to another embodiment, information is provided after bidding but prior to acceptance. A bidder can cancel a bid if the material terms are not in a condition where a purchaser wants to continue with a bid.

A dealer accepts a bid 908 that was facilitated by the host. The dealer can do this through a number of different embodiments. The dealer can accept the bid in a similar manner to information disclosed at action 812 of FIG. 8. Information can transfer from the dealer to the host.

There can be depletion of the economic resource 910. According to one embodiment, an account is created that has a $1 million pool that was determined at event 902. A purchaser makes three related bids at $500,000 each. After the first bid is accepted, there is $500,000 left in the pool. A second bid can be accepted leaving no money in the pool. Thus, the economic resource is depleted. Depletion is not limited to complete removal of the economic resource, but to lowering the economic resource to a level that is lower then a bid. For example, using the previous example, the pool is originally at $1.1 million. Acceptance of two of the bids leaves the pool below the amount to cover the third bid (e.g., $100,000 is not enough to cover a transaction of $500,000.)

Notification can be sent to a provider relating to another bid 912. For example, after a bid is accepted first in time, other dealers with outstanding bids can be notified that there has been an acceptance. According to another embodiment, there is sending of notification by the host to dealers after a bid is made to another dealer.

There is foreclosing acceptance of at least one temporally subsequent related bid of sale 914. According to one embodiment, if there is not enough economic resource in a pool, then an attempted acceptance of a bid is rejected. According to another embodiment, a bid that is not accepted first in time is rejected.

Figure 10:
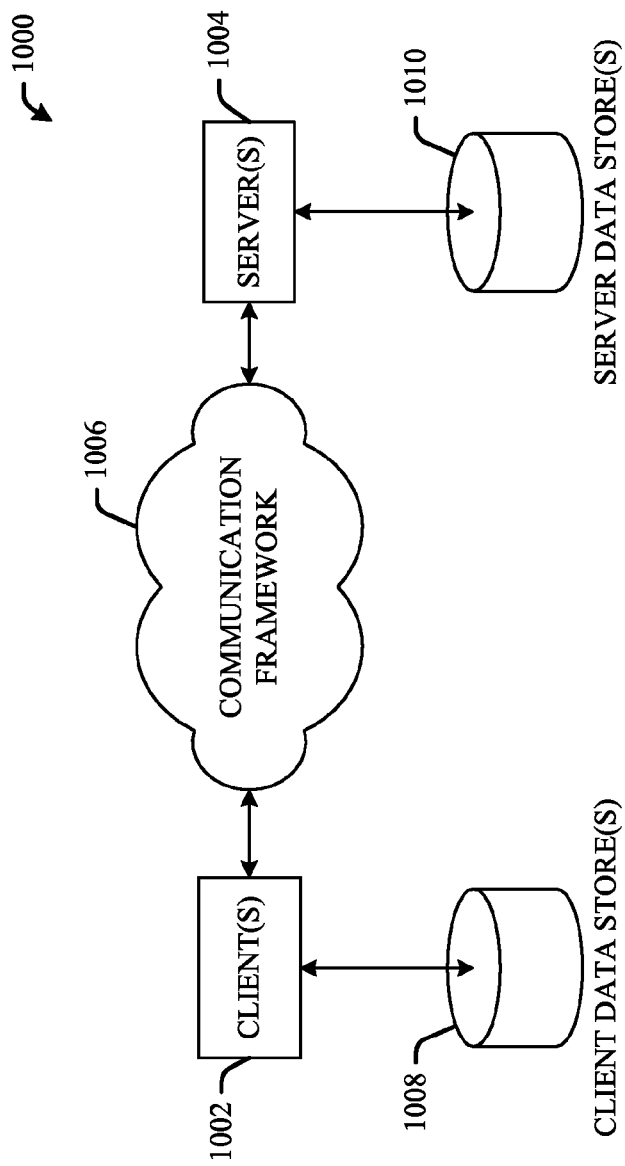
FIG. 10 illustrates an example of a schematic block diagram of a computing environment in accordance with the subject specification.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Figure 11:
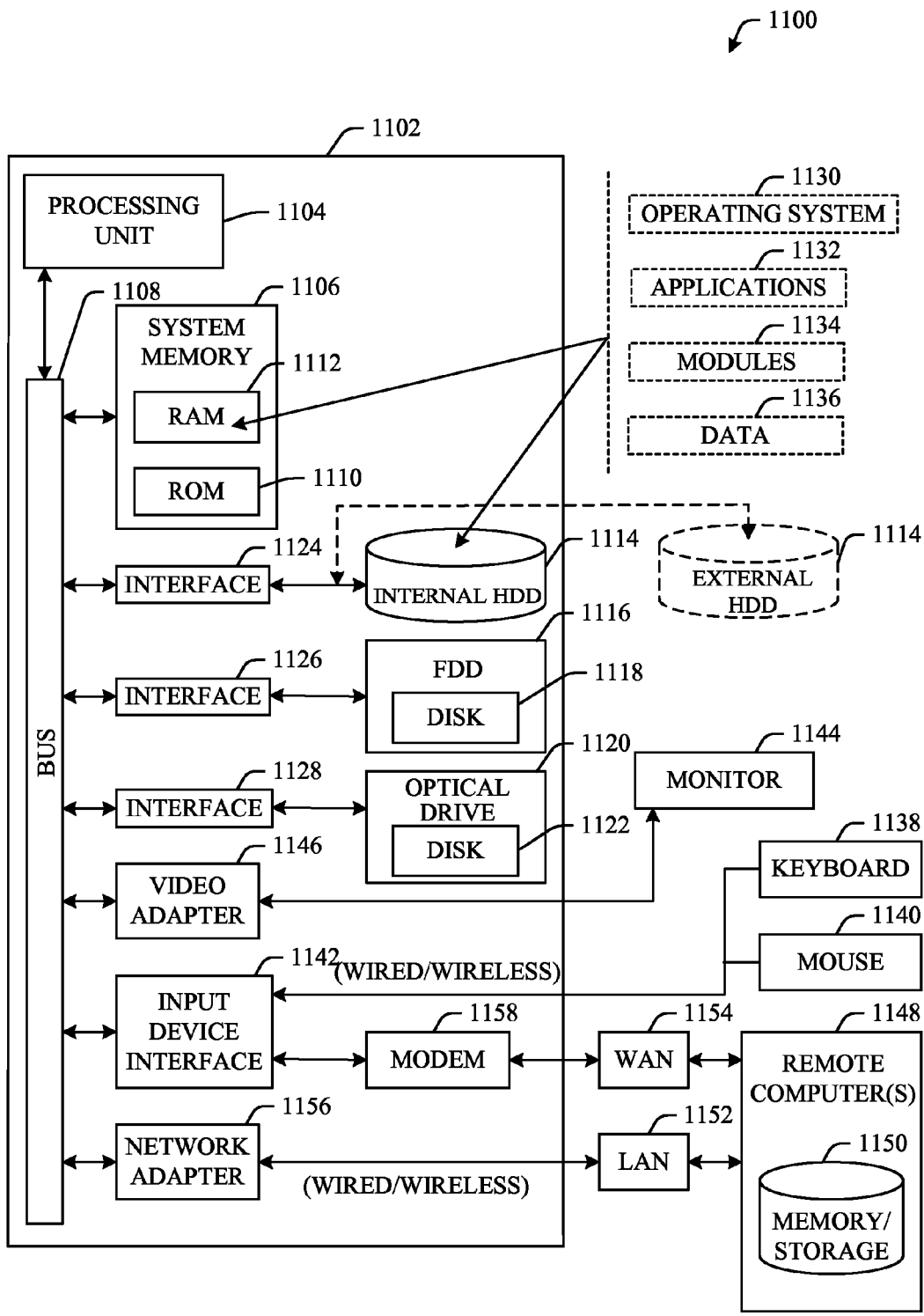
FIG. 11 illustrates an example of a block diagram of a computer operable to execute the disclosed architecture.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a communication component that interacts with at least one entity;
an account component that engages in a transaction with a non-bidding entity that is first in time to accept a bid directed to the non-bidding entity from a group of at least two related bids on at least two goods or services or both from a plurality of bidding entities, the account component having a resource base specifying an amount of money for the goods or a designated amount of time for performing the services;
a calculation component that accepts or rejects a counter-bid without consulting the bidding entity based at least in part on an artificial intelligence that allows the account component to automatically accept the bid that is first in time, the artificial intelligence relying on inferences based in part upon training on Hidden Markov Models (HMMs) based at least in part on a purchaser's previous actions, commands, or instructions during use of the account component;
the account component configured to engage in another transaction with another non-bidding entity that is subsequent to the bid that is first in time, the account component further configured to accept another bid of the another transaction without draining the resource base;
a stoppage component that prevents engagement of the subsequent transaction related to the engaged transaction once the non-bidding entity accepts the bid directed to the non-bidding entity; and
the account component further configured to override the prevented engagement of the subsequent bid, if acceptance of the bid occurred, a notification of the engaged transaction has been sent to the purchaser, and the purchaser placed a new bid with an additional non-bidding entity.

2. The system of claim 1, wherein the calculation component that computes information associated to a response to a bid.

3. The system of claim 1, further comprising a database that contains information relating to history of the non-bidding entity.

4. The system of claim 1, wherein the resource base that governs engagement of the another transaction concerning an acceptance of the another bid subsequent to the bid that was accepted first in time.

5. The system of claim 1, further comprising a regulator that checks if a bid from the bidding entity is within constraints of the account component.

6. The system of claim 1, further comprising a pending transaction notification component that notifies at least one non-bidding entity of the presence of at least one other bid.

7. The system of claim 1, wherein material conditions of the goods or services are available to a bidding entity prior to an acceptance of bid.

8. The system of claim 1, wherein the account component operates in conjunction with a credit card.

9. A method implemented on a computing device, the method comprising:
interacting, by the computing device, with at least one entity;
engaging, by the computing device, in a transaction with a non-bidding entity that is first in time to accept a bid directed to the non-bidding entity from a group of at least two related bids on at least two goods or services or both from a plurality of bidding entities, the transaction being governed by a resource base specifying an amount of money for the goods or a designated amount of time for performing the services;
employing, by the computing device, an artificial intelligence to automatically accept or to reject a counter-bid, the artificial intelligence relying on inferences based in part upon training on Hidden Markov Models (HMMs) based at least in part on a purchaser's previous actions, commands, or instructions during use of the account component;
engaging, by the computing device, with another non-bidding entity that is subsequent to the non-bidding entity that is first in time to accept the bid;
accepting another bid of the another non-bidding entity without draining the resource base;
preventing engagement, by the computing device, of a subsequent transaction related to the engaged transaction once the non-bidding entity accepts the bid directed to the non-bidding entity; and
overriding the prevented engagement of the subsequent bid, if the bid has been accepted, a notification of the engaged transaction has been sent to the purchaser, and the purchaser placed a new bid with an additional non-bidding entity.

10. The method of claim 9, further comprising computing information, by the computing device, associated with a response to a bid.

11. The method of claim 9, further comprising evaluating information, by the computing device, relating to history of the non-bidding entity, the information being stored in a database.

12. The method of claim 9, further comprising governing engagement of another transaction, by the computing device, concerning an acceptance of another bid subsequent to the bid that was accepted first in time.

13. The method of claim 9, further comprising checking, by the computing device, whether a bid from the bidding entity is within constraints of the account component.

14. The method of claim 9, further comprising notifying, by the computing device, at least one non-bidding entity of the presence of at least one other bid.

15. The method of claim 9, wherein material conditions of the goods or services are available to a bidding entity prior to an acceptance of bid.

16. The method of claim 9, wherein the account component operates in conjunction with a credit card on the computing device.

* * * * *